United States Patent [19]
Wagner

[11] 3,749,060
[45] July 31, 1973

[54] CIRCULAR PEN FOR BROOD SOW WITH PIGLETS

[76] Inventor: Jakob Wagner, Straubinger Strasse 21, 8404 Worth, Germany

[22] Filed: Sept. 24, 1971

[21] Appl. No.: 183,431

[52] U.S. Cl.................... 119/16, 119/20, 119/27, 119/53
[51] Int. Cl............................................. A01k 1/02
[58] Field of Search................... 119/20, 1, 30–34, 119/16, 27, 28, 51.11, 51.13, 53, 71

[56] References Cited
UNITED STATES PATENTS

| | | | |
|---|---|---|---|
| 3,103,912 | 9/1963 | Benedetto | 119/14.04 |
| 3,283,744 | 11/1966 | Conover | 119/20 X |
| 3,396,703 | 8/1968 | Trussell | 119/30 |
| 3,191,577 | 6/1965 | McMurray | 119/20 X |

Primary Examiner—Russell R. Kinsey
Assistant Examiner—J. W. Eskovitz
Attorney—Maxwell E. Sparrow et al.

[57] ABSTRACT

A circular pen for brood sows with piglets has a free center area for keeper personnel which is surrounded by an inner manure depositing area, while radial constricting boxes for the dam and piglet compartments close to them are provided between the manure area and an external ring-shaped feed trough. The constricting boxes with the piglet compartments, the feed troughs and the manure depositing area rotate in the feeding cycle rythm whereby the feed trough is consistently filled from a common supply bin according to a daily controlled program and whereby simultaneously the incurring manure is moved by a stationary scraper into a collecting channel. The reverse system is also disclosed in which the means for food distribution and for manure removal may be rotatable while the stalls for the animals are stationary.

23 Claims, 22 Drawing Figures

Fig.11
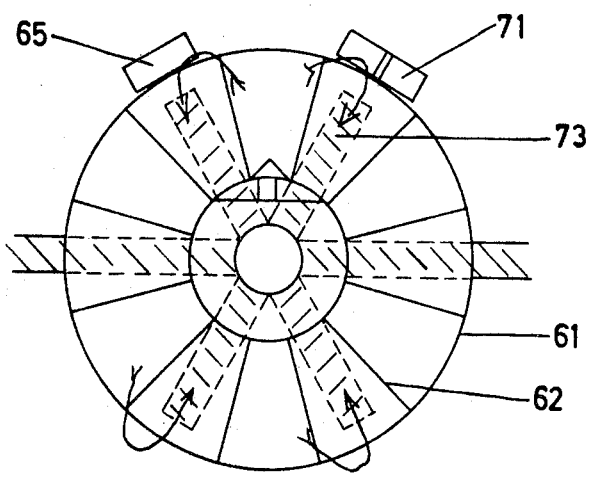
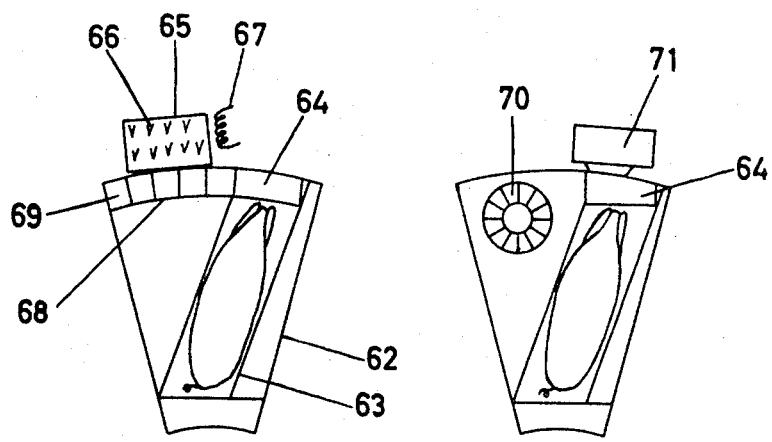
Fig.11a          Fig.11b

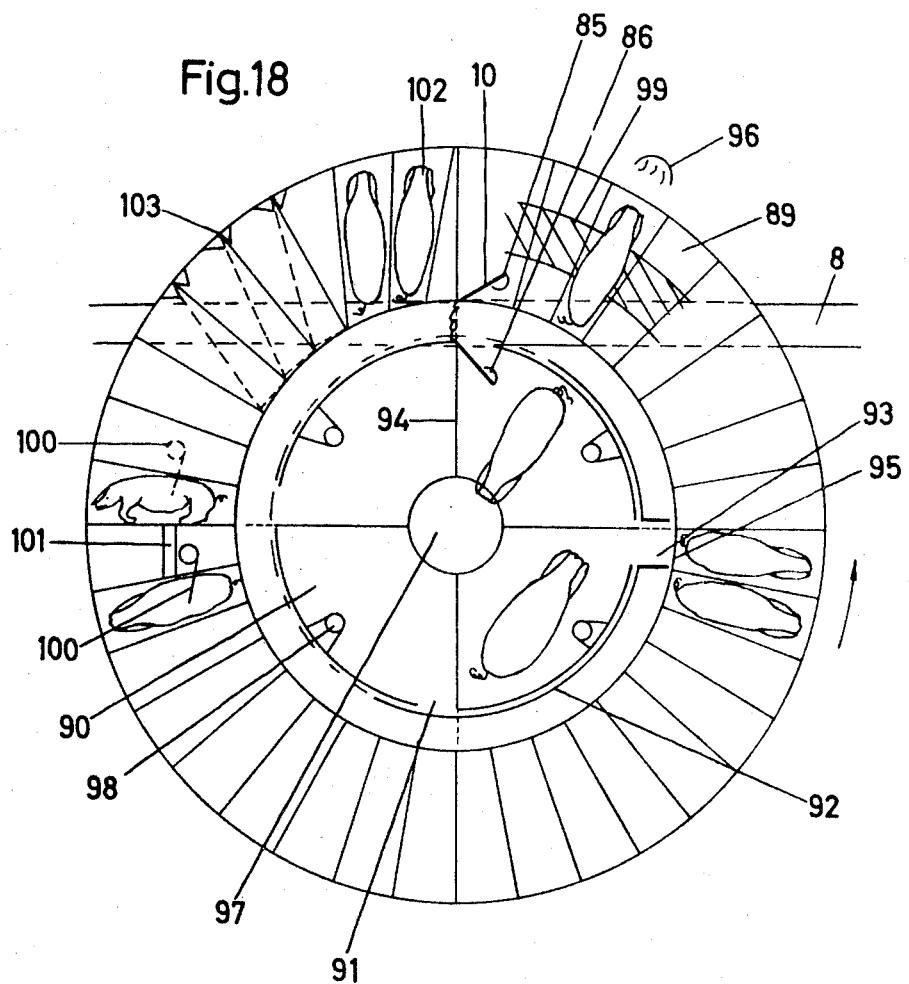

3,749,060

CIRCULAR PEN FOR BROOD SOW WITH PIGLETS

BACKGROUND OF THE INVENTION

The invention relates to animal husbandry and particularly to circular hog-raising stable installations with separate stalls for the brood sows and the piglets and for automatic feeding devices and manure removal.

Circular stables are known for large cattle and also are known for the fattening of hogs. However, these devices are not suitable for breeding because they do not meet the very high standards for hygiene and cleanliness, as well as for the careful separation of individual sows and their piglets from one another in order to prevent contaminations and the transferring of infections. These very high standards are required on account of the susceptibility of the breeding animals and of the newborn piglets to many illnesses and infections which are inherent in a lack of proper hygiene in conditions of feeding and environment. The invention is directed to a solution of the complex problems arising from the conditions necessary for the successful breeding of hogs as its has been outlined above.

SUMMARY

The invention consists in such novel features, construction arrangements, combinations of parts and improvements, as may be shown and described in connection with the device herein disclosed by way of example only and as illustrative of a preferred embodiment.

The circularly shaped hog stable which is particularly designed for breeding purposes, has a circular inner center area. The inner center area is surrounded by a ring of manure-dumping places. This ring is surrounded by a plurality of radially arranged constricting stalls for the brood sows. An outer ring carrying the feed troughs for the sows surrounds the stalls concentrically. Constricting stalls or bays for the sows, the feed troughs and the manure dump rotate independently of one another, whereby the feed troughs are continuously refilled from a common source of supply according to daily controlled feed programs and whereby simultaneously the occurring dung will be removed into a central channel by a stationary scraper.

In the special embodiment which is designated for animal care immediately after birth-giving, a compartment for the piglets is provided adjacent every constricting stall. In this case, the stalls have parallel longitudinal walls. Furthermore, a manure scraper with a water flushing device is provided for removing the dung, reaching over the manure dump area of the stall but running through openings in the walls of the compartments through which the piglets cannot escape and being otherwise out of reach of the piglets. By this construction of a circular stable, the breeding conditions for the piglets are especially favorable and the piglets are protected against illness as far as possible. Furthermore, the arrangement permits a very good supervision of both the female and male animals during the time of fecundation and pregnancy in correspondingly disposed stalls without piglets, and also of the piglets in suitable piglet compartments during the entire period of stay. Feeding is performed in the best mode of operation and supervision, and operation is so simple that in a medium-size farm a maximum number of brood sows, for example 100 per year, can be supervised by a few attendants. This is a very considerable improvement over the prior practices.

Objects and advantages of the invention will be set forth in part hereafter and in part will be obvious herefrom or may be learned by practicing the invention, the same being realized and attained by means of the instrumentalities and combinations pointed out in the appended claims.

It is an object of the invention to provide for a circular hog breeding stable device which has rotating facilities for the sows and their piglets.

It is another object of the invention to provide for automatic feeding devices for the animals, which rotate together with the individual animal's stalls.

A further object of the invention is to provide for continuous removal of the dung of the animals.

Furthermore, it is an object of the invention to provide for a circular, rotating, multiple stall hog breeding device which is built with a maximum of facilities for cleanliness, hygienic conditions and general health of the animals.

Yet another object of the invention is to provide novel hog breeding facilities which can be operated easily and economically.

Various further and more specific purposes, features and advantages will clearly appear from the detailed description given below taken in connection with the accompanying drawings which form part of this specification and illustrate merely by way of example embodiments of the device of the invention.

BRIEF DESCRIPTION OF THE DRAWINGS

In the following description and in the claims, parts will be identified by specific names for convenience, but such names are intended to be as generic in their application to similar parts as the art will permit. Like reference characters denote like parts in the several figures of the drawing, in which

FIG. 11 is a plan view of a circular stable arranged for the early weaning of the piglets;

FIGS. 11a and 11b illustrate details and modifications of the device shown in FIG. 11;

FIG. 18 is a plan view of the stable shown in FIG. 18.

DESCRIPTION OF THE PREFERRED EMBODIMENTS

Figure 1:
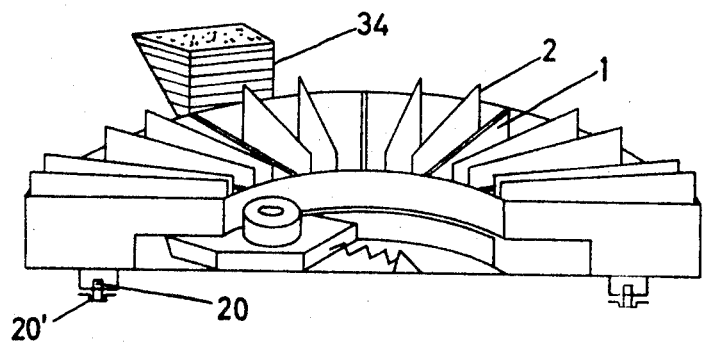
FIG. 1 shows a section of a circular stable in perspective view.
Figure 1A:
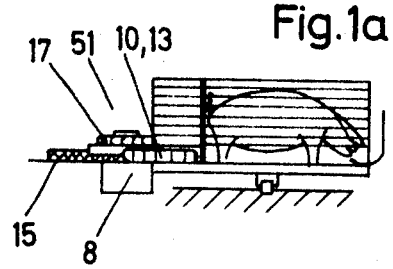
FIG. 1a shows a side view of one stall of the device shown in FIG. 1.
Figure 2:
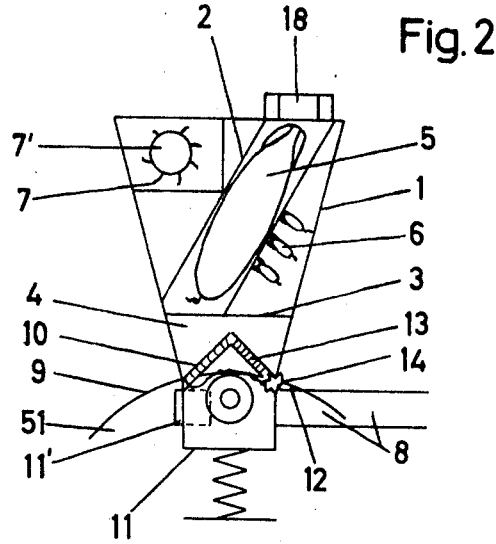
FIG. 2 is a plan view of a single segment with a constricting stall during the first part of a breeding period.

Referring now in more detail to the drawings illustrating preferred embodiments by which the invention may be realized, there is shown in FIGS. 1 through 9 a circular stable having a plurality of individual stalls 1 arranged in ring shape. Each stall 1 has the floor shape of a segment of a circle or of a wedge and has a constricting bay 2 for the dam 5. Constricting bay 2 is diagonally arranged during the first part of the breeding period, comprising 4 to 8 days, during which period birth is given to the piglets. In this diagonal partition, a space 4 is defined by a wall 3, which is neither accessible to sow 5 nor to piglets 6. Furthermore, a warming room 7 having a heat radiating lamp 7' is provided for piglets 6 which otherwise can move freely about in the stall 1. Piglets 6 like to retreat to room 7 after feeding during the first days after their birth.

A manure sewer canal 8 is arranged across and below the circular stable, approaching closely at the inner circumference 9 thereof, so that a stationary scraper 10 projects into space 4, catching the dung therein while passing through and scraping it into an opening 11' wherefrom it is moved over the edge 12 into manure sewer canal 8.

Figure 3:
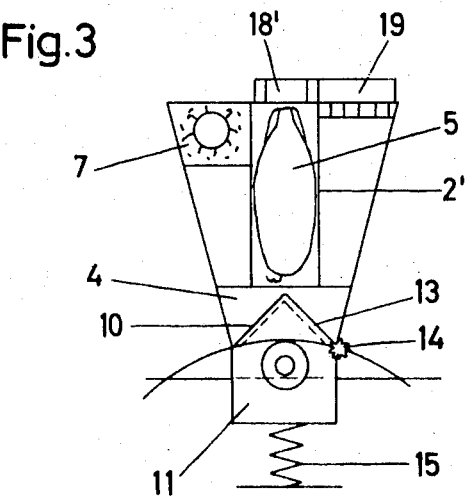
FIG. 3 is the plan view of a single segment during the second part of a breeding period for a medium size sow.
Figure 4:
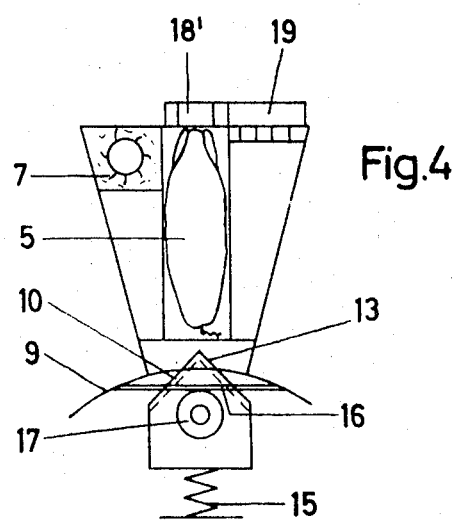
FIG. 4 is the plan view of a single segment with a stall for a large sow.
Figure 5:
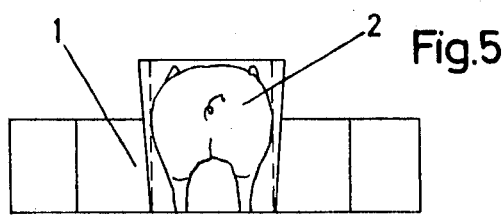
FIG. 5 shows the front view of FIGS. 3 and 4.

When piglets 6 are 4 to 8 days old, diagonal constricting bay 2 is moved to the radial position 2' (FIG. 3). At the same time, partition wall 3 is removed so that space 4 is now also accessible to piglets 6. In order to prevent them from being caught by scraper 10 when the same passes through, a rotating horizontal brush 13 is provided for protection which is rotated by way of a gear 14 (FIGS. 2 and 3) in such manner that the bristles move at the floor toward space 4 so that a piglet which might get into the area of action of brush 13 will be kept away from the area of action of scraper 10. Brush 13 has only enough clearance above the floor, for example 5–6 cm., so that piglets 6 cannot slip through below it while the dung is not touched by it but is caught by scraper 10. In order to prevent a piglet from being wedged in between brush 13 and the wall of the bay the angle between the two should be at least 90°, preferrably 100°.

It can happen that a large sow touches the scraper when it passes there during the rotation. In order to avoid injuries or damages, the entire scraper 10 together with the box 11 is radially slidingly arranged and is yieldingly supported by a spring 15. The dung which is moved by scraper 10 drops through hole 11' of box 11 (FIG. 2) into manure sewer canal 8. In the case of an oversize dam 5 an intermediate block 16 (FIG. 4) is provided on the inner side 9 of the corresponding bay 1, and a sensing wheel 17 is provided on box 11, which abuts against intermediate block 16 and rolls on the latter. Scraper 10 is thus moved so much back that the animal 5 does not get into contact therewith in the first place. Sensing wheel 17 which is in mesh with the inner border 9 during the entire rotary movement serves also to drive brush 13 by way of an idler wheel 14 (not all shown in the drawing). A trough 18 for the dam and a trough 19 for the piglets is provided on every stall 1 on the external periphery of the circular stable. Trough 18 can be shifted from the position at numeral 18 in FIG. 2 to the position at 18' in FIG. 3 according to the position of constricting bay 2. The entire circular stable is supported by equally spaced wheels 20 which roll in a circular channel rail 20'.

Furthermore, the longitudinal walls of constricting bays 2 diverge preferably upwardly from the floor to a certain degree, that is, that their distance from one another is approximately 6 to 10 cm. wider on top than on the floor. This results in not hemming in too much the dam while it is standing, but has to go through the narrower lower passage and thus can only lie down with some effort. Thus, the piglets cannot be caught by surprise and can escape safely so that losses of piglets by squashing may be avoided while the dam is not inhibited during feeding.

Figure 6A:
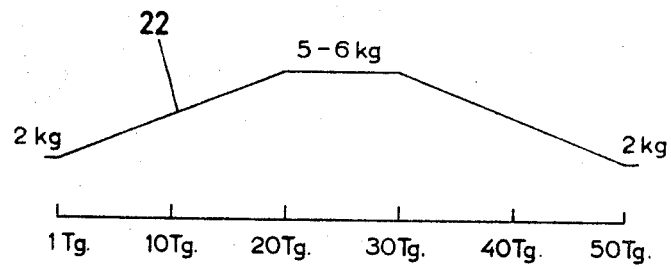
FIG. 6a shows a graph of the feeding course.
Figure 6B:
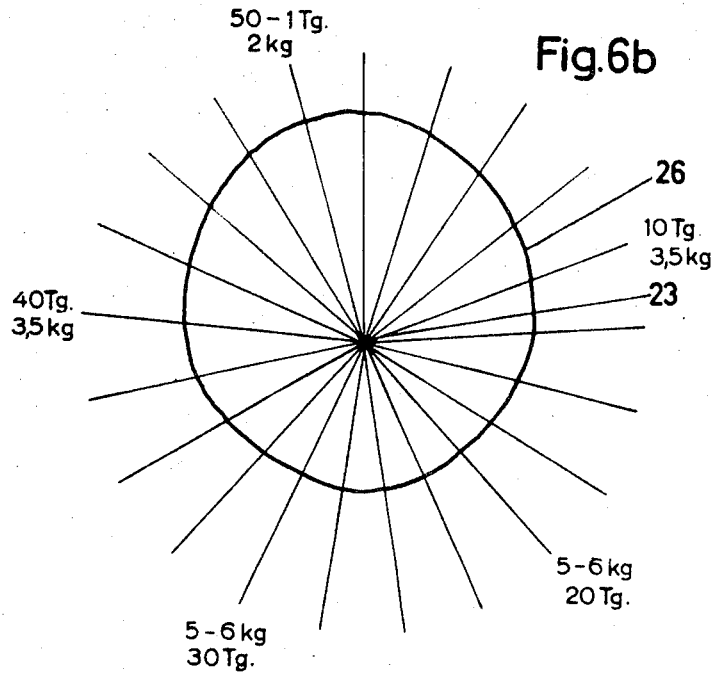
FIG. 6b shows a cam for the performance of the feeding course.
Figure 7:
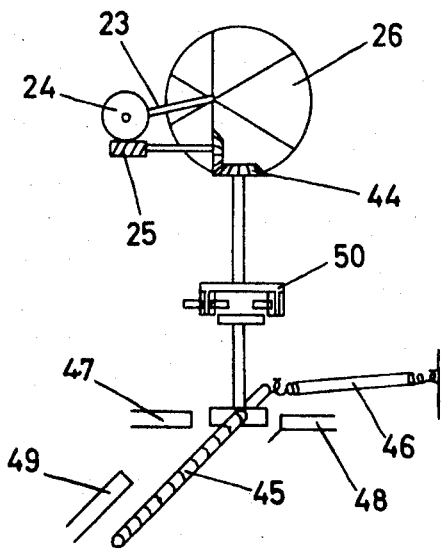
FIG. 7 illustrates schematically the principle of the feeding controls.
Figure 8:
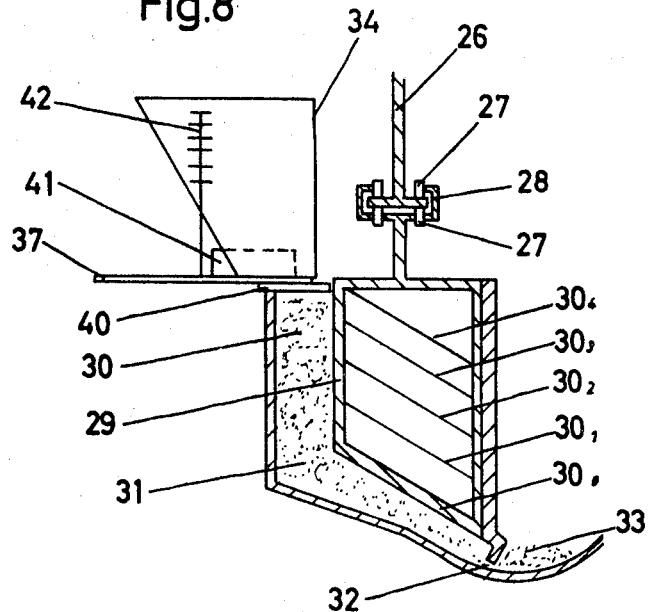
FIG. 8 shows a secton through a slider for the feeding control.

The feed graph 22 (FIG. 6a) has been developed; that is, the need for food increases during the entire period of 50 days from 2 kg. per day to 5 – 6 kg. per day, and decreases back to 2 kg. per day. In order to guarantee this need for food and the daily permissible maximum amount of food during the entire breeding period, a control device is provided (FIGS. 6b, 7, 8). The need for food may vary independent of the actual intake thereof influenced by illness or by indigestion, stomach trouble, etc.

Figure 9:
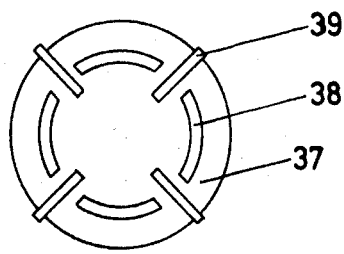
FIG. 9 illustrates schematically the lower closing plate of the feed cone.

On a horizontal shaft 23 a drive wheel 24 is fastened which is driven by a worm 25, and a cam 26 (FIG. 6b) is also located on shaft 23. The cam profile corresponds to graph 22 (FIG. 6a). Cam 26 has a rim with a T-shaped section (FIG. 8) which is engaged on both flanges of the T by holding wheels 27 which are journalled on a double-U-shaped support 28. The arms of support 28 extend to a slider 29 which is vertically movable in a container 30. Slider 29 can assume the positions $30_0$, $30_1$, $30_2$, $30_3$ and $30_4$ corresponding to the acting points on cam 26. The space 31 which is not affected in container 30 by slider 29 is set for the minimum daily amount which might be assumed to be 2 kg. When space 31 has been filled by the position $30_0$ of slider 29, automatically downward sliding food 33 is continuously offered in such an amount to the animal through a lower opening 32 corresponding to the feeding desire of the former, that it can feed its fill. When the animal is satiated, the remaining amount of food builds up in space 31 and a further supply is stopped. When slider 29 is kept in position $30_1$ by a corresponding position of cam 26, an amount of 4 kg. is offered to the animal, and similarly in the other positions. When the offered amount is only partly used, the used partial portion is only replaced at the next following food supply because only so much food glides down from the stationary feeding hopper 34 until space 31 including such additional spaces which had been provided by a position of slider 29. The lower opening of stationary feeding hopper 34 is closed by a disc 37 which revolves around a stationary shaft 42. Disc 37 has a plurality of slots 38 (four are shown in FIG. 9) which are evenly distributed on the periphery thereof. Slots 38 permit the passing of food from hopper 34 to space 31. The movement is so slow that during the passing of box 30 the latter can be filled with food. Disc 37 is driven by drivers 39 which engage with counterparts 40 on box 30 of the rotating circular stable. At each food supply procedure, cam 37 is indexed by one increment. Slots 38 are shorter than the floor of food hopper 34 and are also narrower, so that inside box 30 certain dead spaces remain during passing by. On the other hand, certain scattered amounts remain inevitably deposited on disc 37. Therefore, a scraper 41 is connected with hopper 34 on the side of the lower opening thereof which slides on rotating disc 37 and which scrapes the scattered amounts over the periphery of the former into box 30 when it passes by the scraper. Agitator arms 43 are attached to shaft 42 of disc 37 as far as the former extends downward into hopper 34, by which the food keeps loosened and stoppages are prevented.

Worm 25 is driven by way of a bevel gear device 44 by a dog 45 which receives the return stroke by a spring 46 and which can be moved between the abutments 47 and 48. Dog 45 consists of a resilient rod which is trailed when passing over a stationary abutment 49 until one of the final abutments is reached, for example abutment 48. Thereby the rotation of bevel gears 44 and of cam 26 is stopped and limited, respectively, while resilient rod 45 gives way until it has passed abutment 49. Spring 46 returns resilient rod to its rest position where it abuts against abutment 47. A quantity control according to the foregoing description may be provided for each component portion in case of a composite feed. Obviously this feed control can be used for both hog breeding and hog fattening purposes. A stop gear 50 is provided for preventing a movement in the opposite direction.

The free center area 50 of the circular stable is used for the personnel for supervisory purposes. Obstetrics may be performed from this area and medication can be given, also the castration of piglets can be performed.

It may be advantageous to combine three of more of these circular stables into a unit within one area, whereby each one can be gas-tightly separated from the other ones from the common manure sewer canal for disinfection purposes. This separation is only possible with circular stables whereas all bays and stalls in the conventional longitudinal stables are affected by the dung odors.

Figure 10:
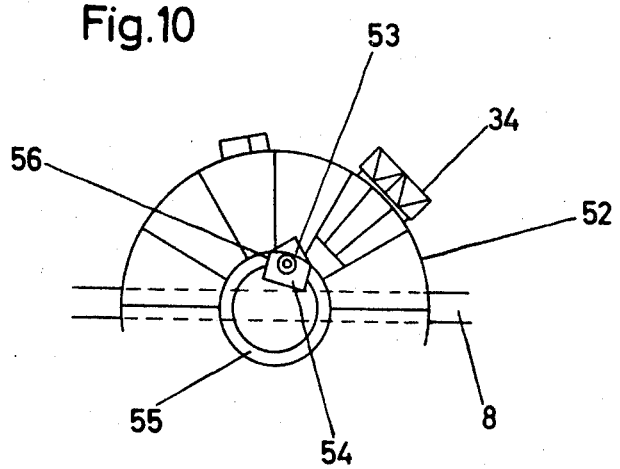
FIG. 10 shows schematically a stationary circular stable with a rotating scraper.

In another embodiment of the invention, a stationary circular stable 52 (FIG. 10) is provided while a rotated scraper 53 with the box 54 moves the dung to a stationary ring-shaped manure canal 55 during the cleaning period (at best at every feeding time). Manure canal 55 communicates at two places with main manure sewer canal 8.

Hopper 34 may also rotate together with slider 53. It is advantageous to provide an auxiliary scraper 56 on slider 53 and on box 54, respectively, which extends into ring-shaped manure canal 55 and which moves the dung during the rotation into main manure sewer canal 8 while crossing the latter twice.

Figure 12:
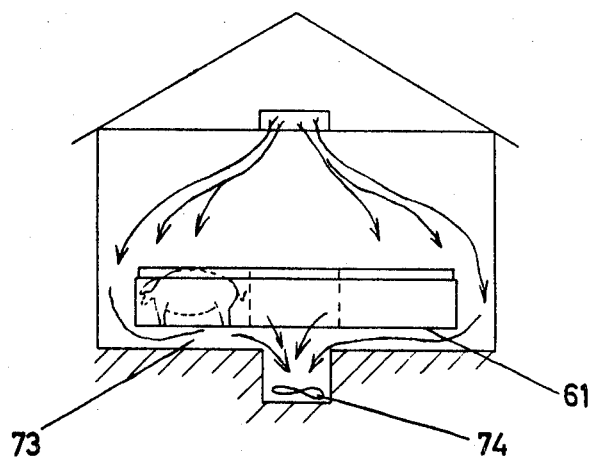
FIG. 12 illustrates in a schematic section view through a stable such as shown in FIG. 11, having air circulation means for winter operation.
Figure 13:
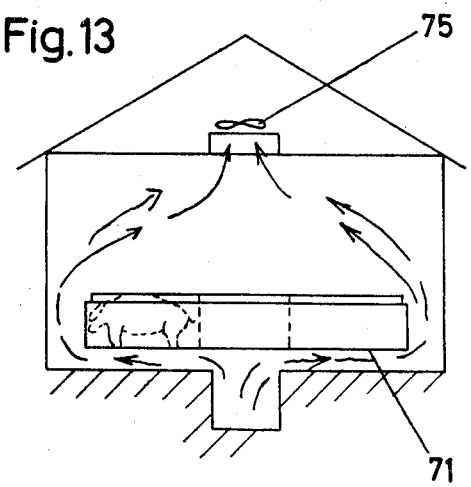
FIG. 13 illustrates in the same schematic section view as shown in FIG. 12 the air circulation means for summer operation.

A further embodiment of the invention is shown in FIGS. 11-13 with regard to making possible an early weaning of the piglets for an improved use of the stables and of the breeding sows. To this extent, a stationary heatable place for liquid feeding of the piglets with artificial teats imitating the natural teats of the dam is arranged near the periphery of the circular stable for the early weaning of the piglets. This place is moved in consecutive order in front of the individual piglet compartments. A feed trough having a separating grille is provided for the subsequently following dry feeding of the piglets for each one of the bays. This results in the advantage that the sow will be available for a new breeding within the shortest time while the raising of the piglets can be continued in the breeding stable after the early weaning until they are ready for sale. This date is reached after 6 to 7 weeks while the sow can be fertilized anew upon the 10th or 11th day after giving birth to the piglets.

However, it is necessary to take care that the piglets are not endangered in their health by the much increased stress which is inherent in early weaning. An antidote against this danger is, particularly, an increased supply of oxygen without the danger of air drafts. For this reason a flow of fresh air in concentrated form supplied by blowers, which can be reversed for summer or winter operations. This flow is directed across the feeding place or places. Especially during feeding, the animals need particularly much oxygen but are not sensitive to air flow effects on account of their much increased activity. The supply of fresh air may be reduced at the resting places.

The fresh air is ducted during the winter time from the top down and is drained off below where the colder air, which is laden with $CO_2$, is accumulated and which also has a higher percentage of relative humidity. This humid and at the same time bad air is quite dangerous in the winter time; but is immediately drained off and is replaced by heated fresh air from the top. Up to this time an air flow — if any fresh air had been supplied — had been generated above the floor, whereby, however, a strong cold caused by evaporation had been generated by the movement of the air in this area which is saturated with humidity. This caused a particularly great danger for the piglets which have a large surface relative to their weight and which are per se much susceptible to illness.

However, the humid air is not brought into contact with the piglets according to the invention, but to the contrary, the flow of heated air is at least partially ducted across the piglets, which is desirable. The pocket of bad air can only be accumulated below the floor plate of the rotating circular stable and is drained off directly from there.

The conditions in the summer time are different. The build-up of relative humidity in the air is low, corresponding to the considerably smaller difference in the temperature between the air inside and the air outside. Otherwise a desirable cooling of the floor area by the still occurring evaporation below the floor, without an air draft getting to the piglets, is attained. The fresh air does not get into contact with warm air below the ceiling of the stable as is the case in known plants, but arrives at the feeding place directly from below.

In FIG. 11 a floor plate 61 of a circular stable is shown, the surface is subdivided by compartment walls 62 into individual breeding stalls in each of which a constricting bay 63 is arranged for the brood sow while the remaining room is provided for the piglets. Feed troughs 64 are provided for the breeding sows. In one place of the periphery is a stationary feeding place 65 for liquid food for the piglets, which has artificial teats 66 for simulating the teats of the dam and for causing the piglets to accept the liquid feed more easily. Such a feeding place even has the advantage over the natural teats that artificial teats yield food dependably as required by the feeding schedule while with a natural breeding sow it often happens that certain teats fail so that the piglets nourished by them starve and eventually die. By an electric heating device 67 (shown schematically in FIG. 11a) the liquid feed is kept at the best temperature (equal to the body temperature). A single place for feeding liquid food is sufficient for the entire circular stable. This feeding place is presented in successive order or sequence to the individual stalls. During the later phase of piglet raising, feeding places 68 for dry food for the piglets are provided, similar to the feeding places 64 for the brood sows, but with separating grilles 69 in order to prevent the piglets, as much as possible, from hampering one another. Such feeding places for dry food may also be arranged in circular form in the stall room itself, such as shown in FIG. 11b at 70. They are filled from a common stationary source of supply 71 by way of a chute during passing-by in a per se known manner, not shown in detail.

In order to provide the necessary fresh air, particularly during feeding time, blowers 72 suck the air during wintertime through ducts 73 downward toward the center and blow it outward from there.

In the case of dry food feeding, a central blower 74 may aspire the air below the entire floor area and move it outward. The heated fresh air which replaces the exhaust taken from the ceiling of the stable, is blown over the feeding places and partly also over the animals without causing any danger to their health. A mixing of the used air collecting below the floor of the circular stable, which is laden with humidity and $CO_2$, with the heated, dry and oxygen-rich fresh air is avoided (FIGS. 12 and 13). The air flow is reversed in summer time. A fan 75 is provided at the highest point of the ceiling of the stable which sucks out the air which enters either below the individual feeding place (liquid food feeding) or over the entire periphery of the circular stable (dry food feeding). The resultant cooling through evaporation on the floor is desirable, particularly because it is limited by the difference between the outside temperature and the inside temperature in the summertime, causing a corresponding lesser increase in humidity. Thus, the early weaning of the piglets is achieved in an especially efficient manner and without endangering the health of the piglets.

Figure 14:
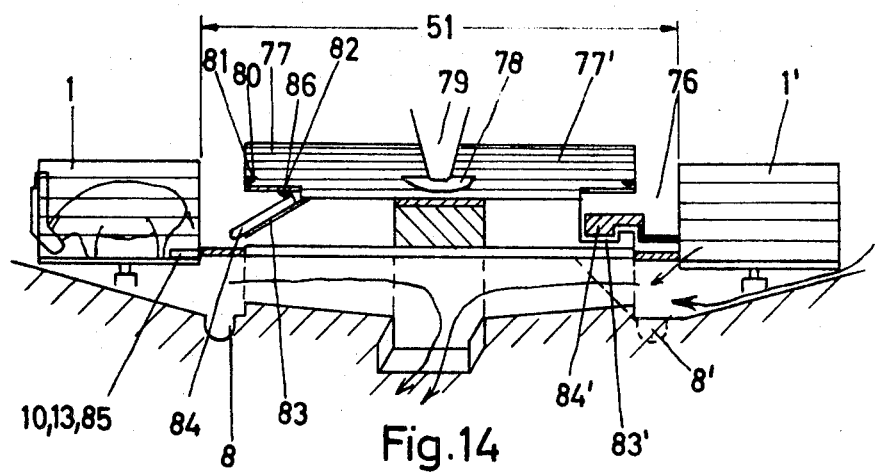
FIG. 14 shows a section of a modified combined stable for brood sows and piglets.
Figure 15:
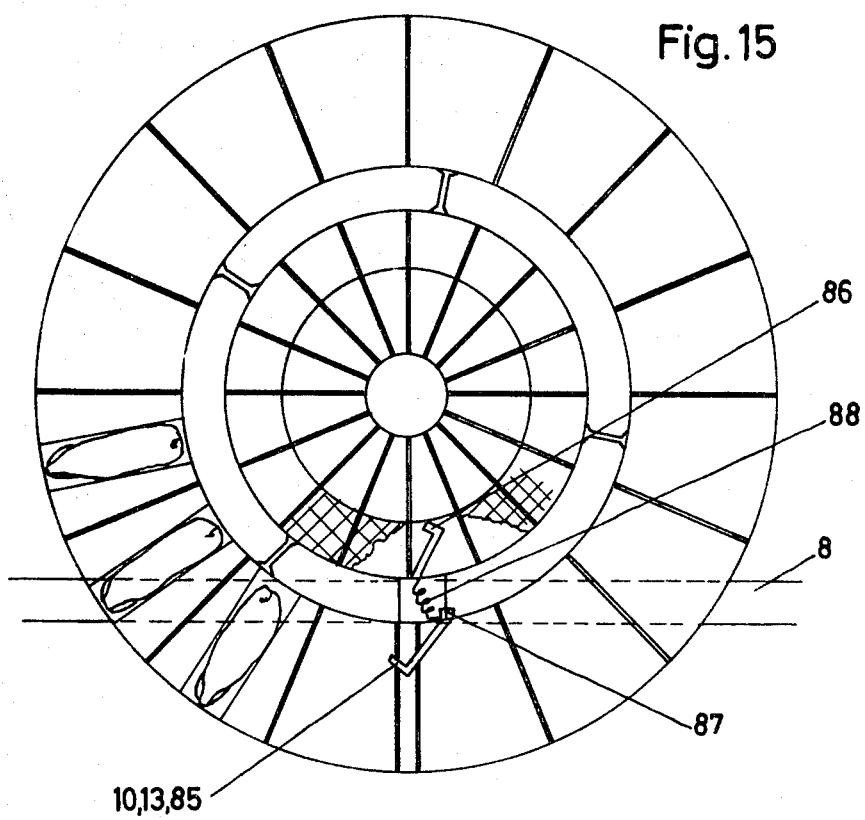
FIG. 15 is a plan view of the stable shown in FIG. 14.

Two further modifications of a stable for brood sows and piglets are shown in FIG. 14 with variations in the left and in the right part of the figure. In both variations, only a ring-shaped area 76 of the circular inner area 51 is reserved for the supervising personnel, while the remaining inner area 77 serves for the raising of piglets which have already been weaned. In this case, the breeding stalls which are then free can be used for other sows which are about to give birth and, obviously also for the new-born piglets. The piglets which still have a light weight may be lifted by hand by the supervising personnel in charge into the elevated center area 77. A round feed trough 78 is provided in the center area 77 into which the dry feed continuously runs down, similar to a chicken feeder. The needed fluid is supplied to the piglets by a ring-shaped pipeline 81 with outlets 80. The fluid is preferably warmed. Central piglet area 77 is arranged in the left-side part of FIG. 14 for rotating together with stalls 1. The dung drops through a grating 82 to a circular chute 83 and is moved during the rotation by a stationary scraper 84 into central manure sewer canal 8, at the same place where the dung from the brood sows' stalls is moved into the same central manure sewer canal 8 by manure scrapers 10, 13. In both cases, the removal of the manure may be improved by flushing nozzles 85, 86. Flushing fluid is only admitted during the rotation by a control valve 87 in the fluid hose line 88.

Figure 16:
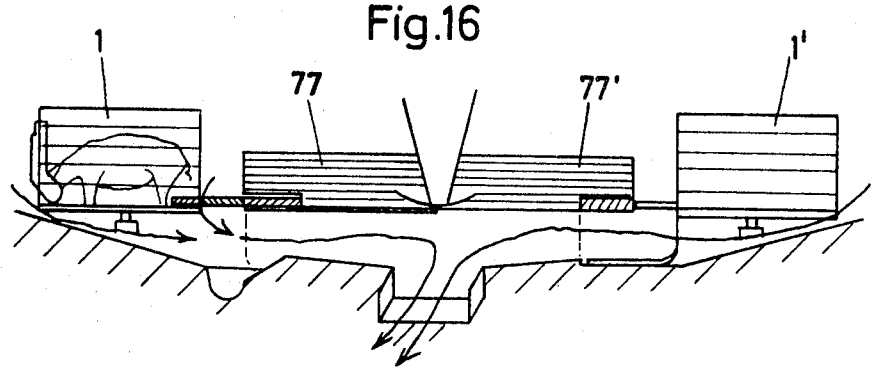
FIG. 16 shows further modifications of the stable illustrated in FIG. 14.
Figure 17:
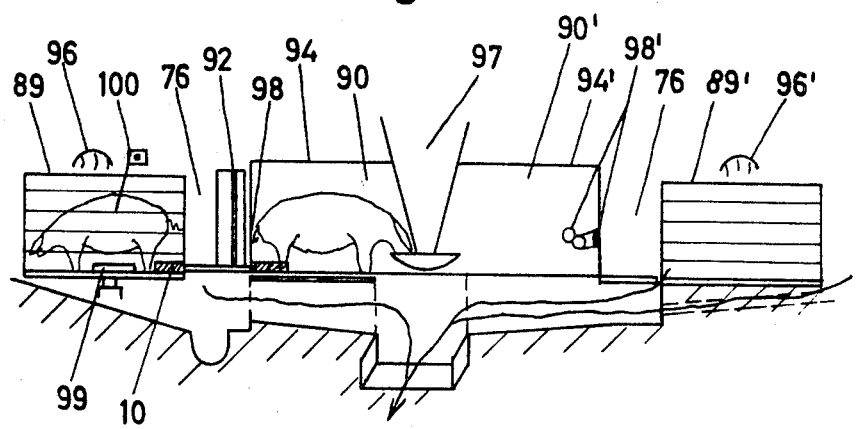
FIG. 17 shows a section of a combined stable for brood sows and stud boars.

According to the embodiment shown in the right-side part of FIG. 14, the piglet area 77' is stationary. In this case the dung drops through a wire mesh 82 into a horizontally arranged manure area 83' in which it is collected by one of the scrapers 84', which rotate together with the stalls, and is moved into stationary manure sewer canal 8'. All other structures such as ventilation ducts and air conditioning are the same as have already been described. In both the left side and the right side embodiments, the areas 77, 77' can be disposed, as shown in FIG. 16, with their floors at the same level as the floor of the surrounding bays (or stalls) 1 and 1'. The sows are preferably transferred immediately into another circular stable after they have been separated from their piglets, as is shown in FIGS. 17 and 18. This circular stable serves the purpose for a new impregnation of the brood sows which in this case are kept in a ring-shaped arrangement in radially disposed constricting stalls 89 for facilitating the act of the impregnation. The center area 90, which is separated by a passage way 76 (FIG. 17) for the personnel in carge of the care, is divided into a number of stalls 90 for the stud boars. In the case of the impregnation, stable stalls 90 for the stud boars may be rotated as indicated in the left half part of FIG. 17, or may be stationary, as illustrated in the right half part of the figure.

Care must be taken during the impregnation period that the stud boars should be admitted to a stall of a brood sow at certain time intervals, for example twice a day at the most or not earlier than after 12 hours, respectively. On the other hand, they should not impregnate twice the same brood sow at full load of the stable. This can be automatically supervised by measuring the increase of weight and subsequent decrease thereof of the respective stall of the brood sow when the stud boar enters it and leaves it, respectively, by means of a scale (not shown in the drawing) or by a seesaw, or by the operation and release of a pin. By this means the access to the brood sow by the stud boar will be automatically blocked after completion of the impregnation.

A further possibility to rationalize the process of impregnation consists in checking continuously the temperature of a brood sow, which preferably would be tied up with a sensing electrode, for example, in a fold of the skin, such as at the armpit of a front leg, and to open the respective stall at the occurrence of the increase of the temperature and subsequent decrease such as it occurs during the main heat of the animal, and to rotate either the part containing the brood sows or the part of the stable containing the stud boars, or both, to such an extent that always only a stud board whose turn it is at this time finds an access to the animal in heat. To this extent each stud boar stall can be provided with an opening 91 (FIG. 18) and the entire stud boar stable can be surrounded by a ring 92 which has only an opening 93 at one location which corresponds to the width of one constricting stall. When a brood sow gets into the heat, ring 92 which is controlled by the checking of the temperature, is rotated so that opening 93 is coordinated with the animal in heat. The stud boar stable, or at least the center part 94, is rotated to such extent that the stud boar whose turn it is, is moved until its opening 91 gets in front of opening 93 in ring 92. Switching may be made in a similar manner as in automatic elevators or in telephone dialing systems. At the same time, the rear compartment door 95 to the preferably tied-up animal in heat can be opened so that the stud boar can get to it. After impregnation which is supervised in the preferred manner as it has been described above, door 91 of the stud boar is bolted and the next following stud boar will be readied. By this mode of operation all animals which get into heat are put together with a stud boar, but otherwise the stud boars are not over-exerted. It is obvious that provision can be made by a timing device to prevent that a stud boar could be used more than once within 12 hours. In a similar way, it can be surveyed by a timing device whether a brood sow is getting into heat a second time after a time period of 20 days. In the first case, the animal remains in the impregnating stall, while the animals which are not getting into heat are transferred into a similarly built stable in which no stud boars are present, but in which the center part is used for low breeding animals in constricting stalls or for storage of drugs, for a disinfecting bath or for the like purposes. Furthermore, in all circular stables one station may be arranged as a disinfecting station wherein one or several animals in turn may be rid of germs by spraying nozzles 96 for disinfecting chemicals.

The stable for the stud boars has in the center thereof a circular feed trough 97 with water supply means 98 in proximity to the dung place, similar to the piglet stable, as described above.

Health impairments of the pregnant brood sows which are confined in designated constricting stalls developed from lack of freedom of movement. In order to overcome this danger without abandoning the idea of the constricting stalls, arrangements can be made for moving the floor and the constricting stalls with respect to one another in suitable time intervals and with suitable velocities. The animals are then forced to follow the lateral movement and are thus forcibly moved to the necessary degree. This movement is relatively faster than the rotation of the feed troughs, which progress daily only by the width of one stall. Time periods of movement and velocities thereof are adapted at best to the statistical natural needs for moving of the animals according to the time of feeding, to the amount of feed and to the digesting cycle. In order to exempt sick animals from the process of moving, a band 99 for rest is provided in the middle area of the stalls between the front legs and the rear legs of the brood sow, which band rotates together with the constricting stalls. Another possibility to detect sick animals consists in a feeler 100 for the back of the animals, by which it is observed during the rotation whether or not each animal has risen. An auxiliary feeler 101 or an abutment may replace the missing animal in an empty stall. It is also advantageous to arrange the longitudinal walls of the constricting stalls in the impregnating and in the breeding stables in an oblique manner relative to the direction of movement of the animals, as indicated by the numeral 102 in FIG. 18 or to attach them to hinges at the head side and to render them swingable at an angle which corresponds to the moving of the animals, such as shown by the numeral 103 in FIG. 18. A limited return movement may be preferably performed after the rotation has been completed until the walls will be returned to the radial position.

While the invention has been described and illustrated with respect to certain preferred example which give satisfactory results, it will be understood by those skilled in the art after understanding the principle of the invention that various other changes and modifications may be made without departing from the spririt of the invention.

What is claimed is:

1. Circular stable for brood sows having piglets, said stable comprising a circular center area; an inner ring having manure dump places surrounding said center area; an outer ring having feed troughs; a plurality of constricting stalls for said sows substantially radially disposed between said inner ring and said outer ring for rotation about said center area, each of said stalls having a floor and parallel walls, an opening in said floor over said manure dump places, a piglet compartment communicating with the remainder of the stall and means to prevent piglets from escaping from said compartment; a main manure sewer canal disposed below said stable; a stationary scraper disposed over said manure dump places and operative to scrape manure from said manure dump places into said main sewer canal; and a stationary feed supply means disposed for continuously filling of said feed troughs according to a daily controlled feed program.

2. Circular stable for brood sows according to claim 1 wherein water flushing means are associated with said scraper.

3. Circular stable for brood sows according to claim 2 wherein said circular center comprising a ring-shaped part set aside for animal keeper personnel and an inner part inside said ring-shaped part for raising weaned piglets.

4. Circular stable for brood sows according to claim 3 including a central feed place for said piglets in said inner part and a water pipe line having drinking outlets on said inner part.

5. Circular stable for brood sows according to claim 1 wherein the filling of said feeding trough is controlled by cam and gear means on each of said stalls, said cam being indexed by said gear means.

6. Circular stable for brood sows according to claim 5 wherein the shape of said cams controls the feed supply for its stall for the entire duration of the breeding period.

7. Circular stable for brood sows according to claim 6 wherein a slider is disposed on said feeding trough for measuring the amount of food dispensed, said slider being moved by said cam.

8. Circular stable for brood sows according to claim 5 having a plurality of gear means and cams operative to control dispensing of partial amounts of various components for a composite food.

9. Circular stable for brood sows according to claim 1 wherein a plurality of individual circular stables are associated with a common main manure sewer canal, each of said individual stables having means for gastight closure of access to said main sewer canal for disinfecting purposes.

10. Circular stable for brood sows according to claim 1 wherein a horizontally arranged rotating brush extends from said scraper to the inner wall of said stall, said brush being located above the floor and operative to rotate in such direction as to move said piglets back into said compartment.

11. Circular stable for brood sows according to claim 1 wherein said circular center area includes stalls for stud boars and means on said stalls to selectively permit access to one of said constricting stalls for said sows.

12. Circular stable for brood sows according to claim 1 including a heatable stationary feeding place for liquid food for said piglets disposed near the outer periphery of said circular stable for presentation in sequence in front of said piglet compartments, said liquid food feeding place having artificial teats, and a feeding trough having separating grilles for dry food for said piglets.

13. Circular stable for brood sows according to claim 1 including blower means disposed for supplying a flow of fresh air from the top of said stable over said feeding trough to the bottom of said stable, and means for reversing the direction of said flow.

14. Circular stable for brood sows for breeding sows according to claim 1, and means operative to move said floor and said constricting stalls in time intervals and at different speeds relative to one another.

15. Circular stable for brood sows according to claim 14 wherein said longitudinal walls of said constricting stalls are disposed at such an angle from the radial position that the head side of the sow when facing the feeding troughs leads in the direction of the rotation.

16. Circular stable for brood sows according to claim 15 wherein said longitudinal walls having hinges at the head side of said stalls, said walls being mounting for swiveling through an angle corresponding to the movement of the animals during the rotation of said stalls.

17. Circular stable for brood sows according to claim 16 including means operative to return said longitudinal walls to the radial position thereof after said rotating movement had been accomplished.

18. Circular stable for brood sows according to claim 14 wherein said means for moving said floor and said constricting stalls move said floor at a higher speed than said constricting stalls.

19. Circular stable for brood sows according to claim 18 including feeler means disposed at the height of the backs of the animals, said feeler means disposed for detecting sick animals while said floor is rotatably moving.

20. Circular stable for brood sows according to claim 14 including a support band for sick animals disposed in the middle portion of said constricting stalls in the area between the space normally occupied by the front legs and the rear legs of a sow, said band moving at the same speed as said constricting stalls.

21. Circular stable for brood sows having piglets, said stable comprising a stationary free circular center; a stationary inner ring-shaped manure dump area surrounding said center area; a stationary ring-shaped feeding trough concentrically arranged to said inner ring-shaped manure dump area; a plurality of stationary radially disposed constricting stalls for said sows between said ring-shaped manure dump area and said ring-shaped feeding trough, each of said stalls having a floor and parallel walls, an opening in said floor over said manure dump areas, a piglet compartment communicating with the remainder of the stall and means to prevent piglets from escaping from said compartment; a main manure sewer canal disposed below said stable, a rotating scraper for moving manure from said manure dump area into said main sewer canal; and a rotating food supply means disposed for continuously filling of said stationary feeding trough according to mechanically controlled predetermined daily feed program.

22. Circular stable for brood sows according to claim 21 including a heatable stationary feeding place for liquid food for said piglets disposed near the outer periphery of said circular stable for presentation in sequence in front of said piglet compartments, said liquid food feeding place having artificial teats, and a feeding trough having separating grilles for dry food for said piglets.

23. Circular stable for brood sows according to claim 21 including blower means operative to supply a flow of fresh air from the top of the stable over said feeding trough to the bottom of said stable, aand means for reversing the direction of said flow.

* * * * *